(12) United States Patent
Rhee et al.

(10) Patent No.: US 9,951,187 B2
(45) Date of Patent: Apr. 24, 2018

(54) THERMOPLASTIC COPOLYMER RESIN HAVING EXCELLENT FLAME RETARDANCY AND TRANSPARENCY AND PREPARATION METHOD THEREFOR

(71) Applicant: SAMYANG CORPORATION, Seoul (KR)

(72) Inventors: Hong Chol Rhee, Daejeon (KR); Young Do Kwon, Daejeon (KR); Ji Eun Kim, Daejeon (KR); Mi Ran Kim, Daejeon (KR); Kyung Mo Sung, Daejeon (KR)

(73) Assignee: SAMYANG CORPORATION, Seoul (KR)

( * ) Notice: Subject to any disclaimer, the term of this patent is extended or adjusted under 35 U.S.C. 154(b) by 0 days.

(21) Appl. No.: 14/898,829

(22) PCT Filed: Jun. 16, 2014

(86) PCT No.: PCT/KR2014/005241
§ 371 (c)(1),
(2) Date: Dec. 16, 2015

(87) PCT Pub. No.: WO2014/204146
PCT Pub. Date: Dec. 24, 2014

(65) Prior Publication Data
US 2016/0122477 A1 May 5, 2016

(30) Foreign Application Priority Data

Jun. 17, 2013 (KR) .................. 10-2013-0068931

(51) Int. Cl.
C08G 64/18 (2006.01)
C08G 77/448 (2006.01)
C08L 83/10 (2006.01)

(52) U.S. Cl.
CPC ......... C08G 77/448 (2013.01); C08G 64/186 (2013.01); C08L 83/10 (2013.01)

(58) Field of Classification Search
CPC .................. C08G 77/448; C08G 64/186
See application file for complete search history.

(56) References Cited

U.S. PATENT DOCUMENTS

| | | | |
|---|---|---|---|
| 2,999,835 A | 9/1961 | Goldberg | |
| 3,028,365 A | 4/1962 | Schnell et al. | |
| 3,153,008 A | 10/1964 | Fox | |
| 3,334,154 A | 8/1967 | Kim | |
| 4,131,575 A | 12/1978 | Adelmann et al. | |
| 6,072,011 A | 6/2000 | Hoover | |
| 2003/0027905 A1* | 2/2003 | Mahood | C08G 64/186 524/155 |
| 2009/0326183 A1* | 12/2009 | Schultz | C08G 64/186 528/196 |
| 2012/0165425 A1 | 6/2012 | Park et al. | |
| 2012/0309922 A1* | 12/2012 | Kim | C08G 64/186 528/25 |

FOREIGN PATENT DOCUMENTS

| | | |
|---|---|---|
| JP | 06-263877 | 9/1994 |
| JP | 2009120707 | * 6/2009 |
| KR | 10-2007-0070326 A | 7/2000 |
| KR | 10-2009-0073474 A | 7/2009 |
| KR | 10-2012-0073818 A | 7/2012 |
| KR | 10-2013-0045799 A | 5/2013 |
| KR | 10-2013-0047332 A | 5/2013 |
| WO | WO-2011/122767 | * 10/2011 |
| WO | WO 2012/106425 A1 | 8/2012 |
| WO | WO 2013/066000 A1 | 5/2013 |

OTHER PUBLICATIONS

International Search Report, issued in PCT/KR2014/005241, dated Sep. 25, 2014.
Extended European Search Report issued in European Patent Application No. 14814167.4 dated Feb. 3, 2017.

* cited by examiner

*Primary Examiner* — David J Buttner
(74) *Attorney, Agent, or Firm* — Birch, Stewart, Kolasch & Birch, LLP

(57) ABSTRACT

The present invention relates to a thermoplastic copolymer resin having an excellent flame retardancy and transparency and a preparation method therefor and, more particularly, to a thermoplastic copolymer resin having an excellent balance of physical properties such as a transparency, a fluidity, a low temperature impact strength as well as a flame retardancy, a preparation method therefor, and a molded article comprising the thermoplastic copolymer resin, in which the thermoplastic copolymer resin is obtained by copolymerizing polysiloxane having a particular structure and a branched polycarbonate oligomer.

8 Claims, No Drawings

THERMOPLASTIC COPOLYMER RESIN HAVING EXCELLENT FLAME RETARDANCY AND TRANSPARENCY AND PREPARATION METHOD THEREFOR

TECHNICAL FIELD

The present invention relates to a thermoplastic copolymer resin having excellent flame retardancy and transparency, and a method for preparing the same. More specifically, the present invention relates to a thermoplastic copolymer resin which is obtained by copolymerizing polysiloxane of a specific structure and branched polycarbonate oligomer, and has good balance between properties of transparency, flowability, low-temperature impact strength, etc., as well as flame retardancy, and a method for preparing the same and a molded article comprising the same.

BACKGROUND ART

Polycarbonate resin has good heat resistance, mechanical properties (in particular, impact strength) and transparency. Thus, it has been extensively used as electrical components, mechanical components and industrial resin. In the electric/electronic fields, in particular, when polycarbonate resin is used for TV housing, computer monitor housing, copier, printer, notebook battery, lithium battery case material, etc., releasing considerable heat, good flame retardancy is required as well as heat resistance and mechanical properties.

The conventional way to impart flame retardancy to a polycarbonate resin is to mix polycarbonate resin and halogenated flame retardant including brominated or chlorinated compound. Halogenated flame retardants exhibit sufficient flame-retarding performance in case of fire, but hydrogen halide gas is generated during resin processing, which can, not only cause cast erosion and environmental issues but also produce dioxin which is toxic and harmful to humans when it burns. Accordingly, a move to regulate use thereof has been extended.

In order to cope with such regulation, flame-retardant polycarbonate resin compositions comprising both alkali metal salt as a non-halogenated flame retardant and fluorinated polyolefin resin as an anti-dripping agent have been developed. However, use of fluorinated ethylene resin and metal salt flame retardant to ensure flame retardancy of polycarbonate resin leads to degraded transparency which is one of the advantages of polycarbonate resin.

In order to overcome such degradation of transparency, alloying with silicone-based additives and silicone-based copolymer has been proposed. However, despite the environmental advantages of non-halogenated flame retardant, the technique using silicone-based additives has disadvantages such as poor optical transparency, relatively high price and limitation on coloring when used as an exterior material. In addition, poor flowability makes it difficult to apply to a large article.

Korean Laid-open Patent Publication No, 10-2007-0070326 discloses a resin composition in which a metal salt of aromatic sulfone compound and a metal salt of perfluoroalkane sulfonate are added to a thermoplastic polycarbonate resin to improve transparency and flame retardancy. However, the polycarbonate resin composition disclosed in this patent publication has disadvantages of blooming phenomenon wherein air bubbles are generated during injection molding according to the injection molding condition, degradation of heat resistance and transparency, etc.

Accordingly, development of a new polycarbonate resin which shows sufficient flame retardancy, and at the same time can realize harmonized properties of good transparency, flowability, low-temperature impact strength, etc. is still required.

CONTENTS OF THE INVENTION

Problems to be Solved

The present invention is intended to resolve the above-stated problems of the prior arts, and has an object of providing a thermoplastic copolymer resin having excellent flame retardancy, and good transparency, flowability and mechanical strength (in particular, low-temperature impact strength), and a method for preparing the same and a molded article comprising the same.

Technical Means

To achieve the above-stated object, the present invention provides a polysiloxane-branched polycarbonate block copolymer comprising, as repeating units, a hydroxy-terminated polysiloxane of the following chemical formula 1 and a branched polycarbonate block:

[Chemical formula 1]

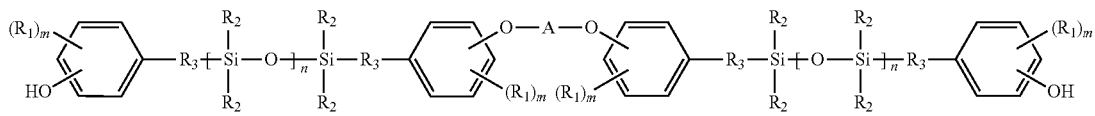

wherein, in chemical formula 1, $R_1$ independently represents hydrogen atom, halogen atom, hydroxy group, alkyl group having 1 to 20 carbon atoms, alkoxy group or aryl group;

$R_2$ independently represents hydrocarbon group having 1 to 13 carbon atoms or hydroxy group;

$R_3$ independently represents alkylene group having 2 to 8 carbon atoms;

m independently represents an integer of 0 to 4;

n independently represents an integer of 1 to 200; and

A represents a structure of the following chemical formula 2 or 3:

[Chemical formula 2]

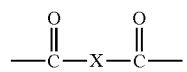

wherein, in chemical formula 2,

X is Y or NH—Y—NH where Y represents linear or branched aliphatic group having 1 to 20 carbon atoms, cycloalkylene group, or mono- or polynuclear arylene group which has 6 to 30 carbon atoms and is unsubstituted or substituted with halogen atom, alkyl group, alkoxy group, aryl group or carboxy group;

[Chemical formula 3]

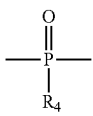

wherein, in chemical formula 3, $R_4$ represents an aromatic hydrocarbon group or aromatic/aliphatic mixed-type hydrocarbon group having 6 to 30 carbon atoms, or an aliphatic hydrocarbon group having 1 to 20 carbon atoms.

The other aspect of the present invention provides a method for preparing a polysiloxane-branched polycarbonate block copolymer, comprising the steps of: preparing branched polycarbonate oligomer; and copolymerizing the prepared branched polycarbonate oligomer and hydroxy-terminated polysiloxane of the above chemical formula 1.

Another aspect of the present invention provides a molded article comprising the polysiloxane-branched polycarbonate block copolymer.

Effect of the Invention

The polysiloxane-branched polycarbonate block copolymer according to the present invention has outstandingly excellent flame retardancy and transparency, and at the same time, good balance between properties of flowability, impact strength (in particular, low-temperature impact strength), etc. Thus, it can be usefully applied in producing office machinery, housing or the like of electric/electronic products, and flame-retardant films and sheets.

Concrete Mode for Carrying out the Invention

The term "reaction product" as used herein means a substance that is formed by reacting two or more reactants.

Furthermore, in the chemical formulas described herein, although the English character "R" used for representing hydrogen, halogen atom and/or hydrocarbon group, etc. has a numerical subscript, "R" is not limited by such a subscript. "R" independently represents hydrogen, halogen atom and/or hydrocarbon group, etc. For example, even if two or more "R"s have the same numerical subscript, such "R"s may represent the same hydrocarbon group or different hydrocarbon groups. Also, even if two or more "R"s have different numerical subscripts, such "R"s may represent the same hydrocarbon group or different hydrocarbon groups.

Hereinafter, the present invention will be described more specifically.

(A) Hydroxy-Terminated Polysiloxane

The hydroxy-terminated polysiloxane comprised in the polysiloxane-branched polycarbonate block copolymer of the present invention as a repeating unit has a structure of the following chemical formula 1.

In the above chemical formula 1:

$R_1$ independently represents hydrogen atom, halogen atom, hydroxy group, alkyl group having 1 to 20 carbon atoms, alkoxy group or aryl group. For example, the halogen atom may be Cl or Br; the alkyl group may be an alkyl group having 1 to 13 carbon atoms such as methyl, ethyl or propyl; the alkoxy group may be an alkoxy group having 1 to 13 carbon atoms such as methoxy, ethoxy or propoxy; and the aryl group may be an aryl group having 6 to 10 carbon atoms such as phenyl, chlorophenyl or tolyl.

$R_2$ independently represents hydrocarbon group having 1 to 13 carbon atoms or hydroxy group. For example, $R_2$ may be an alkyl or alkoxy group having 1 to 13 carbon atoms, alkenyl or alkenyloxy group having 2 to 13 carbon atoms, cycloalkyl or cycloalkoxy group having 3 to 6 carbon atoms, aryloxy group having 6 to 10 carbon atoms, aralkyl or aralkoxy group having 7 to 13 carbon atoms, or alkaryl or alkaryloxy group having 7 to 13 carbon atoms.

$R_3$ independently represents alkylene group having 2 to 8 carbon atoms.

The subscript "m" independently represents an integer of 0 to 10, and preferably an integer of 0 to 4.

The subscript "n" independently represents an integer of 1 to 200, preferably an integer of 1 to 50, and more preferably an integer of 5 to 20. If the number of silicone block units are too small, the impact resistance and flame retardancy of the copolymer may not be satisfactory. If the number of silicone block units are too large, the silicone blocks may agglomerate during extrusion or injection molding and thus the transparency may deteriorate.

A represents a structure of the following chemical formula 2 or 3:

[Chemical formula 2]

In the above chemical formula 2, X is Y or NH—Y—NH where Y represents linear or branched aliphatic group having 1 to 20 carbon atoms, cycloalkylene group (for example, cycloalkylene group having 3 to 6 carbon atoms), or mono- or polynuclear arylene group which has 6 to 30 carbon atoms and is unsubstituted or substituted with halogen atom, alkyl group, alkoxy group, aryl group or carboxy group. For example, X may be an aliphatic group that is unsubstituted or substituted with halogen atom, an aliphatic group that contains oxygen, nitrogen or sulfur atom in its main chain, or an arylene group that can be derived from bisphenol A, resorcinol, hydroquinone or diphenylphenol.

[Chemical formula 3]

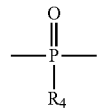

[Chemical formula 1]

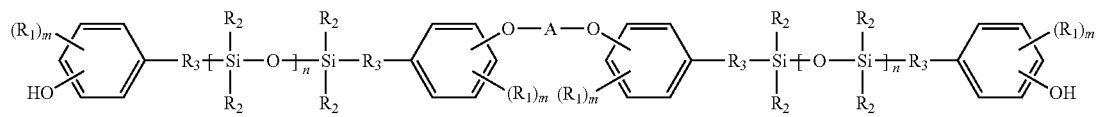

In the above chemical formula 3, $R_4$ represents an aromatic hydrocarbon group or aromatic/aliphatic mixed-type hydrocarbon group having 6 to 30 carbon atoms, or an aliphatic hydrocarbon group having 1 to 20 carbon atoms. $R_4$ may have a structure containing halogen, oxygen, nitrogen or sulfur as well as a carbon atom(s). For example, $R_4$ may be phenyl, chlorophenyl or tolyl (preferably, phenyl).

An exemplary structure of the above chemical formula 2 may be one of the following chemical formulas 2a to 2h.

[Chemical formula 2a]
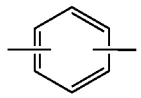

[Chemical formula 2b]
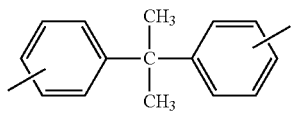

[Chemical formula 2c]
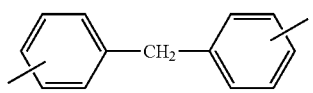

[Chemical formula 2d]
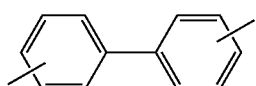

[Chemical formula 2e]
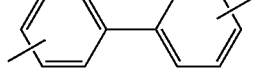

[Chemical formula 2f]
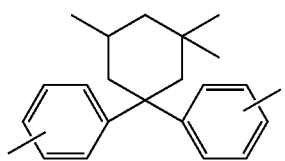

[Chemical formula 2g]
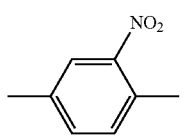

[Chemical formula 2h]
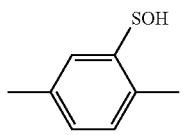

In one embodiment, the hydroxy-terminated polysiloxane of the above chemical formula 1 may be a reaction product of a hydroxy-terminated siloxane of the following chemical formula 1a and an acyl compound (i.e., a hydroxy-terminated siloxane having ester linkage).

[Chemical formula 1a]
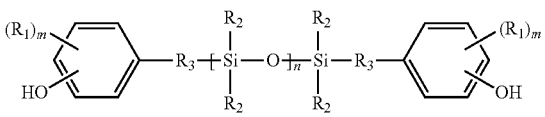

In the above chemical formula 1a, $R_1$, $R_2$, $R_3$, m and n are the same as defined in chemical formula 1 above.

The hydroxy-terminated siloxane of the above chemical formula 1a may be prepared, for example, by synthesizing a compound of the following chemical formula 1b having hydroxy group and double bond, and a compound of the following chemical formula 1c containing silicon by using platinum catalyst in a molar ratio of 2:1.

[Chemical formula 1b]
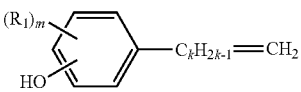

In the above chemical formula 1b, $R_1$ and m are the same as defined in chemical formula 1 above, and k represents an integer of 1 to 7.

[Chemical formula 1c]
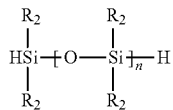

In the above chemical formula 1c, $R_2$ and n are the same as defined in chemical formula 1 above.

Concretely, as a hydroxy-terminated siloxane of the above chemical formula 1a, a siloxane monomer from Dow Corning

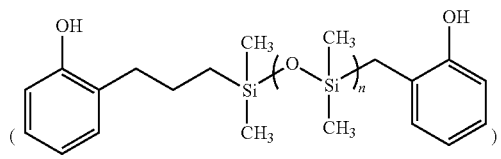

may be used, but it is not limited thereto. In addition, regarding the preparation of a hydroxy-terminated siloxane of the above chemical formula 1a, U.S. Pat. No. 6,072,011 may be referred to.

The acyl compound used in preparing the hydroxy-terminated polysiloxane of the above chemical formula 1 may have, for example, an aromatic structure, an aliphatic structure, or a mixed-type structure comprising both aromatic and aliphatic groups. When the acyl compound is of an aromatic structure or a mixed-type structure, it can have 6 to 30 carbon atoms, and when the acyl compound is of an aliphatic structure, it can have 1 to 20 carbon atoms. The acyl compound may further comprise halogen, oxygen, nitrogen or sulfur atom.

In another embodiment, the hydroxy-terminated siloxane of the above chemical formula 1 may be a reaction product of a hydroxy-terminated siloxane of the above chemical formula 1a with diisocyanate compound (i.e., a hydroxy-terminated siloxane having urethane linkage).

The diisocyanate compound may be, for example, 1,4-phenylenediisocyanate, 1,3-phenylenediisocyanate or 4,4'-methylenediphenyl diisocyanate.

In another embodiment, the hydroxy-terminated polysiloxane of the above chemical formula 1 may be a reaction product of a hydroxy-terminated siloxane of the above chemical formula 1a and a phosphorus-containing compound of the following chemical formula 1d (an aromatic or an aliphatic phosphate compound).

[Chemical formula 1d]

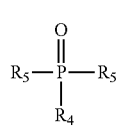

In the above chemical formula 1d, $R_4$ is the same as defined in chemical formula 3 above, and $R_5$ independently represents phosphorus, halogen atom, hydroxy group, carboxy group, alkyl group (having 1 to 20 carbon atoms), alkoxy group or aryl group.

It is preferable to maintain the molar ratio of the hydroxy-terminated siloxane of chemical formula 1a and a phosphorus-containing compound of chemical formula 1d in a range of 3:1 to 1:1, and more preferably 2:1 to 1.5:1. If the molar ratio of the formula 1a compound to the formula 1 d compound is less than 1, the property may deteriorate due to the unreacted phosphorus-containing compound. If the molar ratio is greater than 3, it may be hard to expect sufficient flame-retarding effect through incorporation of the phosphorus-containing compound.

A concrete example of the hydroxy-terminated polysiloxane of the above chemical formula 1 obtained by reacting a hydroxy-terminated siloxane of chemical formula 1a and a phosphorus-containing compound of chemical formula 1d may have the following structure.

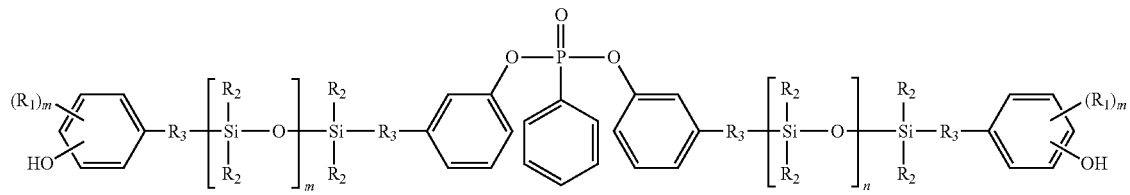

In the above structure, $R_1$, $R_2$, $R_3$, m and n are the same as defined in chemical formula 1 above.

(B) Branched Polycarbonate Block

The branched polycarbonate block comprised in the polysiloxane-branched polycarbonate block copolymer of the present invention as a repeating unit is incorporated into the copolymer of the present invention by reacting branched polycarbonate oligomer with the hydroxy-terminated polysiloxane of chemical formula 1.

There is no special limitation in the method for preparing the branched polycarbonate oligomer. For example, the branched polycarbonate oligomer may be prepared by adding a branching agent to oligomeric polycarbonate and reacting them. Alternatively, the branched polycarbonate oligomer may be prepared by Phosgene method wherein dihydric phenol compound and phosgene are mixed with a branching agent together, but it is not limited thereto.

For the branching agent, it is preferable to use, for example, an organic compound having 3 or more (for example, 3 to 4) branching functional groups independently selected from the group consisting of hydroxy group (—OH), carboxy group (—COOH), amino group (—NH$_2$), acid halide (—COCl) and formyl group (—CHO). Examples of the branching agent include 1,1,1-tris(4-hydroxyphenyl)ethane (THPE), mellitic acid, trimellitic acid, trimellitic acid chloride, trimellitic anhydride, pyromellitic acid, resorcyclic acid, resorcinaldehyde, trimellitiltrichloride, trihydroxyflavone derivative (for example, 2,4,4-trimethyl-2,4-7-trihydroxyflavone), Phloroglucin, or a mixture thereof, but it is not limited thereto.

In preparation of the branched polycarbonate oligomer, preferably, 0.001 to 10 mol % of the branching agent may be used, based on 100 mol % amount of the dihydric phenol compound used, and more preferably 0.01 to 3 mol %, still more preferably 0.03 to 1.5 mol % of the branching agent may be used. If the amount of the branching agent used is too little, the impact resistance and flame retardancy of the resulting copolymer may be unsatisfactory. In contrast, if the amount of the branching agent used is too much, peeling off may occur during injection molding and the transparency may deteriorate.

The dihydric phenol compound used in preparation of the branched polycarbonate oligomer may be, for example, a compound of the following chemical formula 4.

[Chemical formula 4]

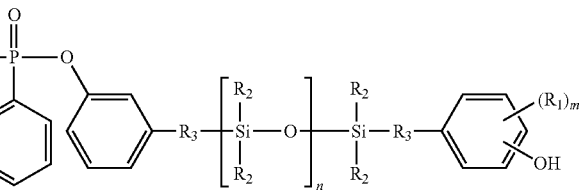

In chemical formula 4, L may represent linear, branched or cyclic alkylene group having no functional group; or linear, branched or cyclic alkylene group comprising functional group such as sulfide, ether, sulfoxide, sulfone, ketone, phenyl, isobutylphenyl, naphthyl, etc. Preferably, L may be linear, branched or cyclic alkylene group having 1 to 10 carbon atoms. $R_6$ and $R_7$ may independently represent hydrogen atom, halogen atom, or linear, branched or cyclic alkyl group. The subscripts "a" and "b" may independently represent an integer of 0 to 4.

The compound of the above chemical formula 4 may be, for example, bis(4-hydroxyphenyl)methane, bis(4-hydroxyphenyl)phenylmethane, bis(4-hydroxyphenyl)naphthylmethane, bis(4-hydroxyphenyl)-(4-isobutylphenyl)methane, 1,1-bis(4-hydroxyphenyl)ethane, 1-ethyl-1,1-bis(4-hydroxyphenyl)propane, 1-phenyl-1,1-bis(4-hydroxyphenyl)ethane, 1-naphthyl-1,1-bis(4-hydroxyphenyl)ethane, 1,2-bis(4-hydroxyphenyl)ethane, 1,10-bis(4-hydroxyphenyl)decane, 2-methyl-1,1-bis(4-hydroxyphenyl)propane, 2,2-bis (4-hydroxyphenyl)propane, 2,2-bis(4-hydroxyphenyl) butane, 2,2-bis(4-hydroxyphenyl)pentane, 2,2-bis(4-hydroxyphenyl)hexane, 2,2-bis(4-hydroxyphenyl)nonane, 2,2-bis(3-methyl-4-hydroxyphenyl)propane, 2,2-bis(3-fluoro-4-hydroxyphenyl)propane, 4-methyl-2,2-bis(4-hydroxyphenyl)pentane, 4,4-bis(4-hydroxyphenyl)heptane, diphenyl-bis(4-hydroxyphenyl)methane, Resorcinol, Hydroquinone, 4,4'-dihydroxyphenyl ether[bis(4-hydroxyphenyl)ether], 4,4'-dihydroxy-2,5-dihydroxydiphenyl ether, 4,4'-dihydroxy-3,3'-dichlorodiphenyl ether, bis(3,5-dimethyl-4-hydroxyphenyl)ether, bis(3,5-dichloro-4-hydroxyphenyl)ether, 1,4-dihydroxy-2,5-dichlorobenzene, 1,4-dihydroxy-3-methylbenzene, 4,4'-dihydroxydiphenol[p,p'-dihydroxyphenyl], 3,3'-dichloro-4,4'-dihydroxyphenyl, 1,1-bis(4-hydroxyphenyl)cyclohexane, 1,1-bis(3,5-dimethyl-4-hydroxyphenyl)cyclohexane, 1,1-bis(3,5-dichloro-4-hydroxyphenyl)cyclohexane, 1,1-bis(3,5-dimethyl-4-hydroxyphenyl)cyclododecane, 1,1-bis(4-hydroxyphenyl) cyclododecane, 1,1-bis(4-hydroxyphenyl)butane, 1,1-bis(4-hydroxyphenyl)decane, 1,4-bis(4-hydroxyphenyl)propane, 1,4-bis(4-hydroxyphenyl)butane, 1,4-bis(4-hydroxyphenyl)isobutane, 2,2-bis(4-hydroxyphenyl)butane, 2,2-bis(3-chloro-4-hydroxyphenyl)propane, bis(3,5-dimethyl-4-hydroxyphenyl)methane, bis(3,5-dichloro-4-hydroxyphenyl)methane, 2,2-bis(3,5-dimethyl-4-hydroxyphenyl)propane, 2,2-bis(3,5-dibromo-4-hydroxyphenyl)propane, 2,2-bis(3,5-dichloro-4-hydroxyphenyl)propane, 2,4-bis(4-hydroxyphenyl)-2-methyl-butane, 4,4'-thiodiphenol[bis(4-hydroxyphenyl)sulfone], bis(3,5-dimethyl-4-hydroxyphenyl)sulfone, bis(3-chloro-4-hydroxyphenyl)sulfone, bis(4-hydroxyphenyl)sulfide, bis(4-hydroxyphenyl)sulfoxide, bis(3-methyl-4-hydroxyphenyl)sulfide, bis(3,5-dimethyl-4-hydroxyphenyl)sulfide, bis(3,5-dibromo-4-hydroxyphenyl)sulfoxide, 4,4'-dihydroxybenzophenone, 3,3',5,5'-tetramethyl-4,4'-dihydroxybenzophenone, 4,4'-dihydroxy diphenyl, methylhydroquinone, 1,5-dihydroxynaphthalene, or 2,6-dihydroxynaphthalene, but it is not limited thereto. Among them, the representative one is 2,2-bis(4-hydroxyphenyl)propane (bisphenol A). For other functional dihydric phenols, U.S. Pat. Nos. 2,999,835, 3,028,365, 3,153,008, 3,334,154 and 4,131,575 may be referred to. The above dihydric phenols may be used alone or in combination with each other.

According to one embodiment of the present invention, the oligomeric polycarbonate may be prepared by adding the above dihydric phenol compound (for example, bisphenol A) in an aqueous alkali solution, and then mixing the resulting mixture and an organic solvent (for example, dichloromethane) in which phosgene gas is injected, and reacting them. At this time, the molar ratio of phosgene to dihydric phenol compound may be maintained within a range of about 1:1 to 1.5:1, and preferably about 1:1 to 1.2:1. The prepared oligomeric polycarbonate may have a molecular weight of 800 to 20,000. To the mixture of organic phase-aqueous phase comprising the oligomeric polycarbonate prepared as such, a branching agent is added, and a molecular weight-controlling agent and a catalyst are added sequentially, whereby a branched polycarbonate oligomer may be formed.

According to another embodiment of the present invention, a branched polycarbonate oligomer may be formed by adding the above dihydric phenol compound (for example, bisphenol A) and a branching agent in an aqueous alkali solution, and then mixing the resulting mixture and an organic solvent (for example, dichloromethane) in which phosgene gas is injected, and reacting them (at this time, the molar ratio of phosgene to dihydric phenol compound may be maintained within a range of about 1:1 to 1.5:1, and preferably about 1:1 to 1.2:1), and adding thereto a molecular weight-controlling agent and a catalyst sequentially.

The polycarbonate oligomer-forming reaction may generally be conducted at a temperature range of about 15 to 60° C. In order to adjust the pH of the reaction mixture, alkali metal hydroxide may be added to the reaction mixture. The alkali metal hydroxide may be, for example, sodium hydroxide.

As the molecular weight-controlling agent, a monofunctional compound similar to a monomer used in preparation of polycarbonate may be used. The monofunctional compound may be, for example, a derivative based on phenol such as p-isopropylphenol, p-tert-butylphenol (PTBP), p-cumylphenol, p-isooctylphenol and p-isononylphenol, or an aliphatic alcohol. Preferably, p-tert-butylphenol (PTBP) may be used.

As the catalyst, a polymerization catalyst and/or a phase transfer catalyst may be used. The polymerization catalyst may be, for example, triethylamine (TEA), and the phase transfer catalyst may be a compound of the following chemical formula 5.

 [Chemical formula 5]

In the above chemical formula 5, $R_8$ may independently represent alkyl group having 1 to 10 carbon atoms, Q may represent nitrogen or phosphorus, and Z may represent halogen atom or —$OR_9$, wherein $R_9$ may represent hydrogen atom, alkyl group having 1 to 18 carbon atoms or aryl group having 6 to 18 carbon atoms.

The phase transfer catalyst may be, for example, [CH$_3$(CH$_2$)$_3$]$_4$NZ, [CH$_3$(CH$_2$)$_3$]$_4$PZ, [CH$_3$(CH$_2$)$_5$]$_4$NZ, [CH$_3$(CH$_2$)$_6$]$_4$NZ, [CH$_3$(CH$_2$)$_4$]$_4$NZ, CH$_3$[CH$_3$(CH$_2$)$_3$]$_3$NZ, CH$_3$[CH$_3$(CH$_2$)$_2$]$_3$NZ, wherein Z may be Cl, Br or —$OR_9$ wherein $R_9$ may be hydrogen atom, alkyl group having 1 to 18 carbon atoms or aryl group having 6 to 18 carbon atoms.

The amount of the phase transfer catalyst is preferably about 0.1 to 10% by weight, based on the reaction mixture. If the amount of the phase transfer catalyst is less than 0.1% by weight, the reactivity may be lowered. If the amount of the phase transfer catalyst is greater than 10% by weight, precipitation may happen or the transparency may deteriorate.

After forming the branched polycarbonate oligomer as above, the organic phase dispersed in methylene chloride is washed with alkali and then separated. Subsequently, the organic phase is washed with 0.1 N solution of hydrochloric acid and then rinsed with distilled water 2 or 3 times.

After rinsing is completed, the concentration of the organic phase dispersed in methylene chloride is adjusted constantly and granulation is conducted by using a constant amount of double-distilled water at 70 to 80° C. If the temperature of double-distilled water is lower than 70° C., the granulation rate is low and thus the granulation time may be too long. If the temperature is higher than 80° C., it may be difficult to obtain polycarbonate with uniform particle size. After granulation is completed, it is preferable to dry the product at 100 to 110° C. for 5 to 10 hours first, and then at 110 to 120° C. for 5 to 10 hours.

The preferable viscosity average molecular weight of the prepared branched polycarbonate oligomer is 800 to 20,000, more preferably 800 to 15,000, and most preferably 1,000 to 12,000. If the viscosity average molecular weight of the oligomeric branched polycarbonate is less than 800, the molecular weight distribution may broaden and physical properties may deteriorate. If the viscosity average molecular weight is greater than 20,000, the reactivity may be lowered.

(C) Polysiloxane-Branched Polycarbonate Block Copolymer

The polysiloxane-branched polycarbonate block copolymer of the present invention comprises, as repeating units, a hydroxy-terminated polysiloxane of the above chemical formula 1 and a branched polycarbonate block.

In the polysiloxane-branched polycarbonate block copolymer of the present invention, the amount ratio of the block of the hydroxy-terminated polysiloxane of chemical formula 1: the branched polycarbonate block may be, as a weight ratio, within a range of 0.1:1 to 10:1, preferably 0.2:1 to 5:1, and more preferably 0.4:1 to 2.5:1. If the relative amount of the siloxane block part in the copolymer is too little, flame retardancy and low-temperature impact strength may deteriorate. In contrast, if the relative amount of the siloxane block part is too much, properties such as transparency, flowability, heat resistance, room-temperature impact strength, etc. may deteriorate and the production cost may increase.

The polysiloxane-branched polycarbonate block copolymer of the present invention preferably has a viscosity average molecular weight (Mv) of 15,000 to 200,000, and more preferably 15,000 to 70,000, when measured in methylene chloride solution. If the viscosity average molecular weight of the copolymer is less than 15,000, the mechanical properties may be lowered remarkably. If the viscosity average molecular weight is greater than 200,000, there may be a problem in the processing of resin due to the increase of melting viscosity.

The polysiloxane-branched polycarbonate block copolymer of the present invention may be prepared by preparing branched polycarbonate oligomer as explained above, and then copolymerizing the prepared branched polycarbonate oligomer and hydroxy-terminated polysiloxane of the above chemical formula 1.

According to an embodiment of the present invention, the polysiloxane-branched polycarbonate block copolymer may be prepared by adding the hydroxy-terminated polysiloxane to the mixture of organic phase-aqueous phase containing the branched polycarbonate oligomer prepared already, and adding thereto a molecular weight-controlling agent and a catalyst sequentially. The molecular weight-controlling agent and catalyst are the same as explained above.

In addition, according to an embodiment, the organic phase in which the prepared copolymer is dispersed in methylene chloride is washed with alkali and then separated. Subsequently, the organic phase is washed with 0.1 N solution of hydrochloric acid and then rinsed with distilled water 2 or 3 times. After rinsing is completed, the concentration of the organic phase dispersed in methylene chloride is adjusted constantly and granulation is conducted by using a constant amount of pure water at 70 to 80° C. If the temperature of pure water is lower than 70° C., the granulation rate is low and thus the granulation time may be too long. If the temperature of pure water is higher than 80° C., it may be difficult to obtain the copolymer in uniformly sized morphology. After granulation is completed, it is preferable to dry the product at 100 to 110° C. for 5 to 10 hours first, and then at 110 to 120° C. for 5 to 10 hours.

The polysiloxane-branched polycarbonate block copolymer according to the present invention has outstandingly excellent flame retardancy and transparency, and at the same time, good balance between properties of flowability, impact strength (in particular, low-temperature impact strength), etc. Thus, it can be usefully applied in producing office machinery, housing or the like of electric/electronic products, and flame-retardant films and sheets.

Therefore, according to another aspect of the present invention, a molded article comprising the polysiloxane-branched polycarbonate block copolymer of the present invention is provided.

The method of molding the polysiloxane-branched polycarbonate block copolymer of the present invention to prepare the molded article is not especially limited, and a method generally used in the field of plastic molding may be utilized to prepare the molded article.

The present invention is explained in more detail through Examples and Comparative Examples below. However, the scope of the present invention is not limited thereby.

EXAMPLES

Preparation Example 1: Preparation of Hydroxy-Terminated Polysiloxane

In a 500 mL three-necked flask equipped with a condenser, under nitrogen atmosphere 0.4 mol of monomer BY16-799 (Dow Corning) was dissolved in 300 mL of chloroform, and then 67 mL of triethylamine (TEA) catalyst was added thereto. Under refluxing of the resulting solution, 0.2 mol of terephthaloylchloride (TCL) dissolved in 1,000 mL of chloroform was slowly added thereto for 1 hour, and the resulting solution was refluxed for 12 hours. After the reaction was completed, the solvent was removed from the solution, and the product was dissolved in acetone and washed with hot distilled water. By drying for 24 hours in a vacuum oven, the hydroxy-terminated polysiloxane having ester linkage of the following chemical formula 6 was prepared. The synthesis was confirmed by H-NMR analysis wherein the peak of methylene group of the polysiloxane was observed at 2.6 ppm, the peak of hydrogen of benzene ring of TCL was observed at 8.35 ppm, and the peak of hydrogen of benzene ring of the polysiloxane was observed at 6.75 to 7.35 ppm.

[Chemical formula 6]

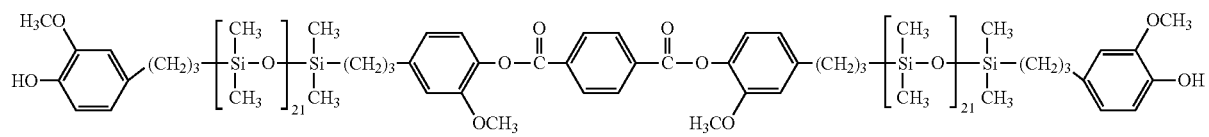

Preparation Example 2: Preparation of Hydroxy-Terminated Polysiloxane Containing Phosphate In a 500 mL three-necked flask equipped with a condenser, under nitrogen atmosphere 22.52 g (0.01 mol) of PMS-25 (Dami Polychem; see Table 1 below) was dissolved in 100 mL of toluene, and then 1.01 g (0.01 mol) of triethylamine (TEA) catalyst was added thereto. Under refluxing of the resulting solution, 0.97 g (0.005 mol) of phenyl phosphonic dichloride was slowly added thereto for 1 hour, and the resulting solution was refluxed for 5 hours. After the reaction was completed, the toluene solvent was removed from the solution, and the product was dried in a vacuum oven for 24 hours to prepare the hydroxy-terminated polysiloxane containing phosphate of the following chemical formula 7.

distilled water at 76° C. After the granulation was completed, the product was dried first at 110° C. for 8 hours and then at 120° C. for 10 hours. Thereby a polysiloxane-branched polycarbonate block copolymer was prepared. The properties of the prepared copolymer were measured, and the results are shown in the following Table 1.

Example 2

Excepting that 2.1 g (3.5 wt % to bisphenol A) of the polysiloxane compound of the chemical formula 6 was used,

[Chemical formula 7]

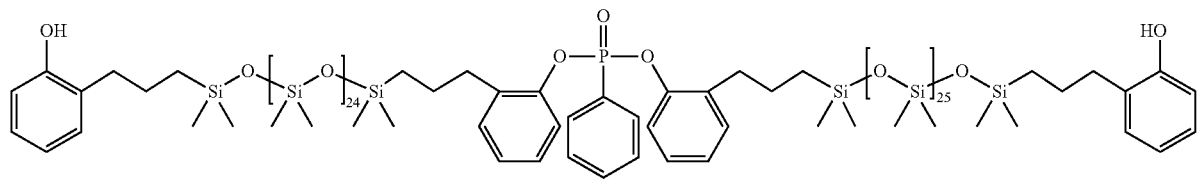

Preparation Example 3: Preparation of Branched Polycarbonate Oligomer

In a 1 L three-necked flask, 60 g (0.263 mol) of bisphenol A and 0.274 g (0.0009 mol) of 1,1,1-tris(4-hydroxyphenyl)ethane (THPE) were dissolved in 330 ml (18.46 g, 0.462 mol) of 5.6 wt % aqueous solution of sodium hydroxide, and 26.0 g (0.263 mol) of phosgene trapped in methylene chloride was slowly added thereto through teflon tube (20 m) and reacted. The outside temperature was maintained at 0° C. The reactants, which passed through the tubular reactor, were interfacially reacted under a nitrogen environment for about 10 minutes to prepare an oligomeric polycarbonate having a viscosity average molecular weight of about 1,000. From the mixture containing the prepared oligomeric polycarbonate, 215 mL of organic phase and 322 mL of aqueous phase were collected and mixed with 1.383 g (9.21 mmol, 3.5 mol % to bisphenol A) of p-tert-butylphenol (PTBP), 0.731 g (2.63 mmol, 1 mol % to bisphenol A) of tetrabutyl ammonium chloride (TBACl) and 0.1 mL of 15 wt % trimethylamine (TEA), and reacted for 30 minutes to prepare a solution of branched polycarbonate oligomer.

Example 1

To the solution of branched polycarbonate oligomer prepared in the above Preparation Example 3, 9 g (15 wt % to bisphenol A) of the polysiloxane compound of the above chemical formula 6 was added. After the phases were separated, only the organic phase was collected and thereto, 283 g of methylene chloride which was the same amount of the organic phase, 110 mL of 1.1 N aqueous solution of sodium hydroxide (20 vol % to the total mixture) and 15 μL of 15 wt % trimethylamine were admixed and reacted for 1 hour, and then 167 μL of 15 wt % trimethylamine and 128 g of methylene chloride were further added thereto and reacted for additional 1 hour. After phase separation, pure water was added to the viscosity-increased organic phase, and it was washed with alkali and separated. Subsequently, the resulting organic phase was washed with 0.1 N hydrochloric acid solution and then rinsed with distilled water 2 or 3 times repeatedly. After the rinse was completed, the concentration of the organic phase was adjusted constantly and then granulated by using a constant amount of doublea polysiloxane-branched polycarbonate block copolymer was prepared by the same method as Example 1. The properties of the prepared copolymer were measured, and the results are shown in the following Table 1.

Example 3

Excepting that 110 mL of 0.81 N aqueous solution of sodium hydroxide was used and 0.395 g (2.62 mmol, 1.0 mol % to bisphenol A) of p-tert-butylphenol (PTBP) was used as a molecular weight-controlling agent, a solution of branched polycarbonate oligomer was prepared by the same method as Preparation Example 3. Then, 9 g (15 wt % to bisphenol A) of the polysiloxane compound of the above chemical formula 6 was added thereto, and a polysiloxane-branched polycarbonate block copolymer was prepared by the same method as Example 1. The properties of the prepared copolymer were measured, and the results are shown in the following Table 1.

Example 4

Excepting that 2.1 g (3.5 wt % to bisphenol A) of the polysiloxane compound of the chemical formula 6 was used, a polysiloxane-branched polycarbonate block copolymer was prepared by the same method as Example 3. The properties of the prepared copolymer were measured, and the results are shown in the following Table 1.

Example 5

Excepting that 9 g (15 wt % to bisphenol A) of the polysiloxane compound of the chemical formula 7 was used, a polysiloxane-branched polycarbonate block copolymer was prepared by the same method as Example 1. The properties of the prepared copolymer were measured, and the results are shown in the following Table 1.

Example 6

Excepting that 2.1 g (3.5 wt % to bisphenol A) of the polysiloxane compound of the chemical formula 7 was used, a polysiloxane-branched polycarbonate block copolymer was prepared by the same method as Example 1. The properties of the prepared copolymer were measured, and the results are shown in the following Table 1.

Example 7

Excepting that 9 g (15 wt % to bisphenol A) of the polysiloxane compound of the chemical formula 7 was used, a polysiloxane-branched polycarbonate block copolymer was prepared by the same method as Example 3. The properties of the prepared copolymer were measured, and the results are shown in the following Table 1.

Example 8

Excepting that 2.1 g (3.5 wt % to bisphenol A) of the polysiloxane compound of the chemical formula 7 was used, a polysiloxane-branched polycarbonate block copolymer was prepared by the same method as Example 3. The properties of the prepared copolymer were measured, and the results are shown in the following Table 1.

Comparative Example 1

A linear polycarbonate was prepared by an interfacial polymerization method without adding a branching agent. The properties of the prepared linear polycarbonate were measured, and the results are shown in the following Table 1.

Comparative Example 2

Properties of a commercial siloxane-containing polycarbonate (EXL 1414, Sabic, siloxane content: 3.5 wt %) were measured, and the results are shown in the following Table 1.

Comparative Example 3

Properties of a commercial siloxane-containing polycarbonate (TRIREX 3026B, Samyang Corporation) were measured, and the results are shown in the following Table 1.

Comparative Example 4

In a 1 L three-necked flask, 60 g (0.263 mol) of bisphenol A and 1,1,1-tris(4-hydroxyphenyl) were dissolved in 330 ml (18.46 g, 0.462 mol) of 5.6 wt % aqueous solution of sodium hydroxide, and 26.0 g (0.263 mol) of phosgene trapped in methylene chloride was slowly added thereto through a teflon tube (20 m) and reacted. The outside temperature was maintained at 0° C. The reactants, which passed through the tubular reactor, were interfacially reacted under a nitrogen environment for about 10 minutes to prepare an oligomeric polycarbonate having a viscosity average molecular weight of about 1,000. From the mixture containing the prepared oligomeric polycarbonate, 215 mL of organic phase and 322 mL of aqueous phase were collected and mixed with 1.383 g (9.21 mmol, 3.5 mol % to bisphenol A) of p-tert-butylphenol (PTBP), 0.731 g (2.63 mmol, 1 mol % to bisphenol A) of tetrabutyl ammonium chloride (TBACl) and 0.1 mL of 15 wt % trimethylamine (TEA), and reacted for 30 minutes to prepare a solution of linear polycarbonate oligomer.

To the solution of linear polycarbonate oligomer prepared above, 9 g (15 wt % to bisphenol A) of the polysiloxane compound of the above chemical formula 6 was added. After the phases were separated, only 283 g of the organic phase was collected and thereto, 0.274 g (0.0009 mol) of 1,1,1-tris(4-hydroxyphenyl)ethane (THPE) was added, and 283 g of methylene chloride which was the same amount of the organic phase, 110 mL of 1.1 N aqueous solution of sodium hydroxide (20 vol % to the total mixture) and 15 μL of 15 wt % trimethylamine were admixed and reacted for 1 hour, and then 167 μL of 15 wt % trimethylamine and 128 g of methylene chloride were further added thereto and reacted for additional 1 hour. After phase separation, pure water was added to the viscosity-increased organic phase, and it was washed with alkali and separated. Subsequently, the resulting organic phase was washed with 0.1 N hydrochloric acid solution and then rinsed with distilled water 2 or 3 times repeatedly. After the rinse was completed, the concentration of the organic phase was adjusted constantly and then granulated by using a constant amount of double-distilled water at 76° C. After the granulation was completed, the product was dried first at 110° C. for 8 hours and then at 120° C. for 10 hours. Thereby a polysiloxane-branched polycarbonate random copolymer was prepared. The properties of the prepared copolymer were measured, and the results are shown in the following Table 1.

The property values shown in the following Table 1 were measured after drying the resins prepared in the above Examples and Comparative Examples at 130° C. for 24 hours. The methods for confirming the copolymers and measuring the properties were as follows.

(1) H-NMR (nuclear magnetic resonance spectroscopy): This analysis was conducted by using Avance DRX 300 (Bruker). The synthesis of branched polycarbonate was confirmed by H-NMR analysis wherein the peak of methyl group of dimethylsiloxane was observed at 0.2 ppm, the peak of hydrogen on the carbone adjacent to the benzene ring of the silicon branching agent was observed at 2.6 ppm, and the peak of methoxy group substituent of the benzene ring of the silicon branching agent was observed at 3.9 ppm.

(2) Viscosity average molecular weight: The viscosity of methylene chloride solution was measured by using an Ubbelohde Viscometer at 20° C., and the limiting viscosity [η] therefrom was calculated according to the following equation.

$$[\eta]=1.23\times10^{-5} M_v^{0.83}$$

(3) Impact strength: The impact strength was measured using RESIL IMPACTOR (CEAST) at room temperature and −50° C.

(4) Total transmittance: The total transmittance was measured in accordance with ASTM D 1003 using a 3 mm-thick test specimen.

(5) Flame retardancy: Flame retardancy was measured according to UL-94 flame retardancy test method (UL: Underwriter's Laboratory Inc.). The test evaluates flame retardancy from flame time or drips of flaming particles after burning on a horizontally fixed specimen of a certain size for 10 seconds. Flame time is the time that the test specimen continued to flame after removal from the ignition source. Ignition of cotton layer was determined through the ignition of the cotton layer set about 300 mm under the specimen by any drips of flaming particles from the specimen. Flame retardancy ratings are as follows.

| | Rating | | |
|---|---|---|---|
| | V-2 | V-1 | V-0 |
| $1^{st}/2^{nd}$ flame time of each specimen | 30 sec. or less | 30 sec. or less | 10 sec. or less |

-continued

| | Rating | | |
|---|---|---|---|
| | V-2 | V-1 | V-0 |
| Total flame time of 5 specimens | 250 sec. or less | 250 sec. or less | 50 sec. or less |
| Ignition of cotton layer by drips | Yes | No | No |

(6) Shear response: Melt index ratio (MIR) was measured in accordance with ASTM D 1238 at 260° C.

TABLE 1

| Properties | | Examples | | | | | | | | Comparative Examples | | | |
|---|---|---|---|---|---|---|---|---|---|---|---|---|---|
| | | 1 | 2 | 3 | 4 | 5 | 6 | 7 | 8 | 1 | 2 | 3 | 4 |
| Siloxane content (wt %/BPA) | | 15 | 3.5 | 15 | 3.5 | 15 | 3.5 | 15 | 3.5 | 0 | 3.5 | 0 | 15 |
| Viscosity average molecular weight (Mv) | | 21,100 | 20,900 | 29,900 | 30,200 | 21,100 | 21,000 | 30,100 | 30,000 | 21,200 | 21,000 | 26,300 | 21,200 |
| Impact strength (kg cm/cm) | Room temperature | 87 | 84 | 102 | 88 | 100 | 84 | 101 | 85 | 80 | 80 | 82 | 85 |
| | −50° C. | 70 | 65 | 97 | 74 | 65 | 62 | 89 | 90 | 12 | 60 | 24 | 55 |
| Total transmittance (%) | | 88 | 89 | 88 | 89 | 88 | 89 | 88 | 89 | 89 | N/A | 88 | 83 |
| Flame retardancy (1.5 mm) | UL rating | V-0 | V-0 | V-0 | V-0 | V-0 | V-0 | V-0 | V-0 | V-2 | V-2 | V-2 | V-2 |
| | Total flame time (sec.) | 21 | 48 | 12 | 25 | 31 | 49 | 21 | 34 | 115 | 85 | 104 | 58 |
| | MIR | 26 | 24 | 25 | 26 | 26 | 26 | 24 | 21 | 11 | 10 | 24 | 24 |

N/A: Measurement not available

As shown in the above Table 1, the polysiloxane-branched polycarbonate block copolymers prepared in Examples 1 to 8 showed remarkably superior flame retardancy, better impact strength (in particular, low-temperature impact strength), and similar or more improved transparency, as compared with the polycarbonates of Comparative Examples 1 to 3 and the polysiloxane-branched polycarbonate random copolymer of Comparative Example 4.

The invention claimed is:

1. A polysiloxane-branched polycarbonate block copolymer comprising, as repeating units, a hydroxy-terminated polysiloxane of the following chemical formula 1-1 or 1-2 and a branched polycarbonate block,
   wherein the branched polycarbonate block is incorporated into the copolymer by reacting a branched polycarbonate oligomer with the hydroxy-terminated polysiloxane of chemical formula 1-1 or 1-2:

[Chemical formula 1-1]

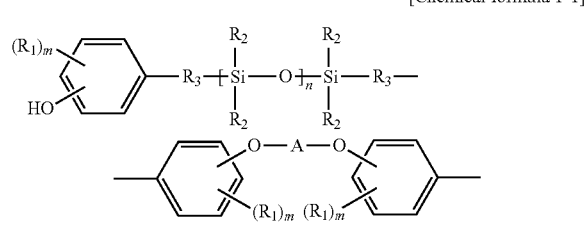

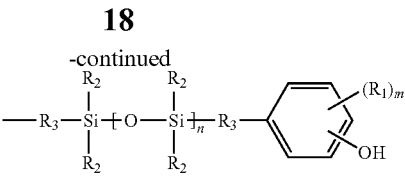

wherein, in chemical formula 1-1,
R$_1$ independently represents methoxy;
R$_2$ independently represents methyl;
R$_3$ independently represents alkylene group having 2 to 8 carbon atoms;
m independently represents an integer of 1;
n independently represents an integer of 5 to 50; and
A represents a structure of the following chemical formula 2:

[Chemical formula 2]

wherein, in chemical formula 2,
X is phenyl which is unsubstituted or substituted with halogen atom, alkyl group, alkoxy group, aryl group or carboxy group;

[Chemical formula 1-2]

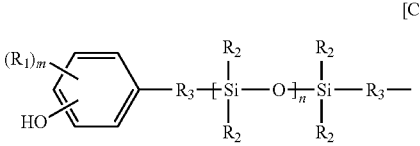

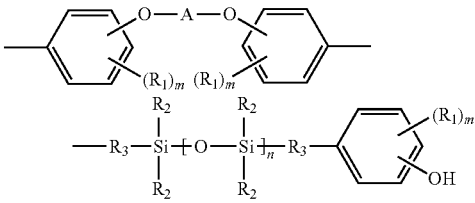

wherein, in chemical formula 1-2,
R₁ independently represents methoxy;
R₂ independently methyl;
R₃ independently represents alkylene group having 2 to 8 carbon atoms;
m independently represents an integer of 0 to 1;
n independently represents an integer of 5 to 50; and
A represents a structure of the following chemical formula 3:

[Chemical formula 3]

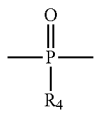

wherein, in chemical formula 3,
R₄ represents phenyl,
wherein the branched polycarbonate oligomer is prepared from bisphenol A,
wherein the polysiloxane-branched polycarbonate block copolymer comprises 3.5% to 15% by weight of the hydroxyl-terminated polysiloxane based on the amount of the bisphenol A used for preparing the branched polycarbonate oligomer,
wherein the branched polycarbonate oligomer is that prepared by adding a branching agent to oligomeric polycarbonate and reacting them,
wherein the branching agent is selected from the group consisting of 1,1,1-tris(4-hydroxyphenyl) ethane, mellitic acid, trimellitic acid, trimellitic acid chloride, trimellitic anhydride, pyromellitic acid, resorcyclic acid, resorcinaldehyde, trimellitiltrichloride, 2,4,4-trimethyl-2,4-7-trihydroxyflavone, Phloroglucin, and mixtures thereof, and
wherein the copolymer shows a total transmittance of 88% to 89% when measured in accordance with ASTM D 1003 at a thickness of 3 mm.

2. The polysiloxane-branched polycarbonate block copolymer of claim 1, wherein the hydroxy-terminated polysiloxane is represented by chemical formula 1-1.

3. The polysiloxane-branched polycarbonate block copolymer of claim 1, wherein the hydroxy-terminated polysiloxane is represented by chemical formula 1-2.

4. The polysiloxane-branched polycarbonate block copolymer of claim 1, wherein 0.001 to 15 mol % of the branching agent is used, based on 100 mol % amount of the bisphenol A used in preparation of the branched polycarbonate oligomer.

5. The polysiloxane-branched polycarbonate block copolymer of claim 1, wherein the branched polycarbonate oligomer has a viscosity average molecular weight of 800 to 20,000.

6. The polysiloxane-branched polycarbonate block copolymer of claim 1, which has a viscosity average molecular weight (Mv) of 15,000 to 200,000.

7. A molded article comprising the polysiloxane-branched polycarbonate block copolymer of claim 1.

8. A method for preparing a polysiloxane-branched polycarbonate block copolymer, comprising the steps of:
preparing branched polycarbonate oligomer; and
copolymerizing the prepared branched polycarbonate oligomer and hydroxy-terminated polysiloxane of the following chemical formula 1-1 or 1-2 to incorporate the branched polycarbonate block into the copolymer:

[Chemical formula 1-1]

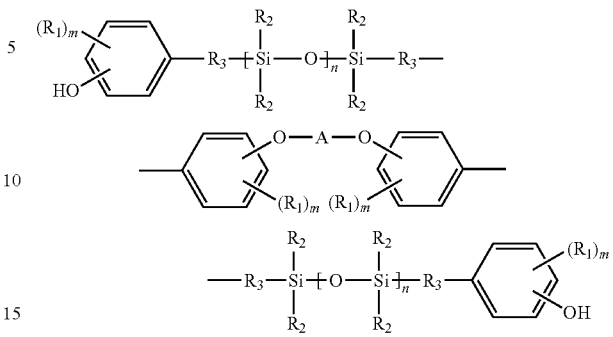

wherein, in chemical formula 1-1,
R₁ independently represents methoxy;
R₂ independently represents methyl;
R₃ independently represents alkylene group having 2 to 8 carbon atoms;
m independently represents an integer of 1;
n independently represents an integer of 5 to 50; and
A represents a structure of the following chemical formula 2:

[Chemical formula 2]

wherein, in chemical formula 2,
X is phenyl which is unsubstituted or substituted with halogen atom, alkyl group, alkoxy group, aryl group or carboxy group;

[Chemical formula 1-2]

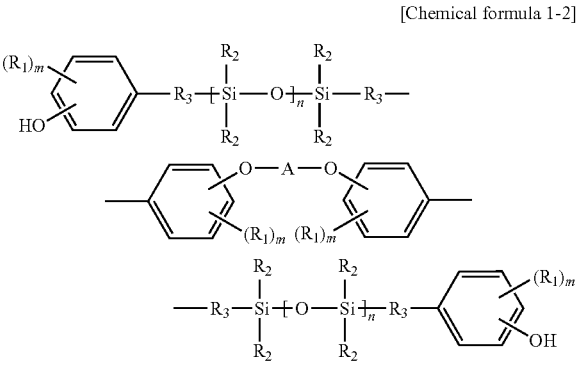

wherein, in chemical formula 1-2,
R₁ independently represents methoxy;
R₂ independently methyl;
R₃ independently represents alkylene group having 2 to 8 carbon atoms;
m independently represents an integer of 0 to 1;
n independently represents an integer of 5 to 50; and A represents a structure of the following chemical formula 3:

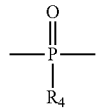

[Chemical formula 3]

wherein, in chemical formula 3,
$R_4$ represents phenyl,
wherein the branched polycarbonate oligomer is prepared from bisphenol A,
wherein the polysiloxane-branched polycarbonate block copolymer comprises 3.5% to 15% by weight of the hydroxyl-terminated polysiloxane based on the amount of the bisphenol A used for preparing the branched polycarbonate oligomer,
wherein the branched polycarbonate oligomer is that prepared by adding a branching agent to oligomeric polycarbonate and reacting them,
wherein the branching agent is selected from the group consisting of 1,1,1-tris(4-hydroxyphenyl) ethane, mellitic acid, trimellitic acid, trimellitic acid chloride, trimellitic anhydride, pyromellitic acid, resorcyclic acid, resorcinaldehyde, trimellitiltrichloride, 2,4,4-trimethyl-2,4-7-trihydroxyflavone, Phloroglucin, and a mixture thereof, and
wherein the copolymer shows a total transmittance of 88% to 89% when measured in accordance with ASTM D 1003 at a thickness of 3 mm.

* * * * *